No. 818,918. PATENTED APR. 24, 1906.
M. RUTHENBURG.
PROCESS OF MANUFACTURING IRON AND ITS ALLOYS.
APPLICATION FILED NOV. 28, 1903.
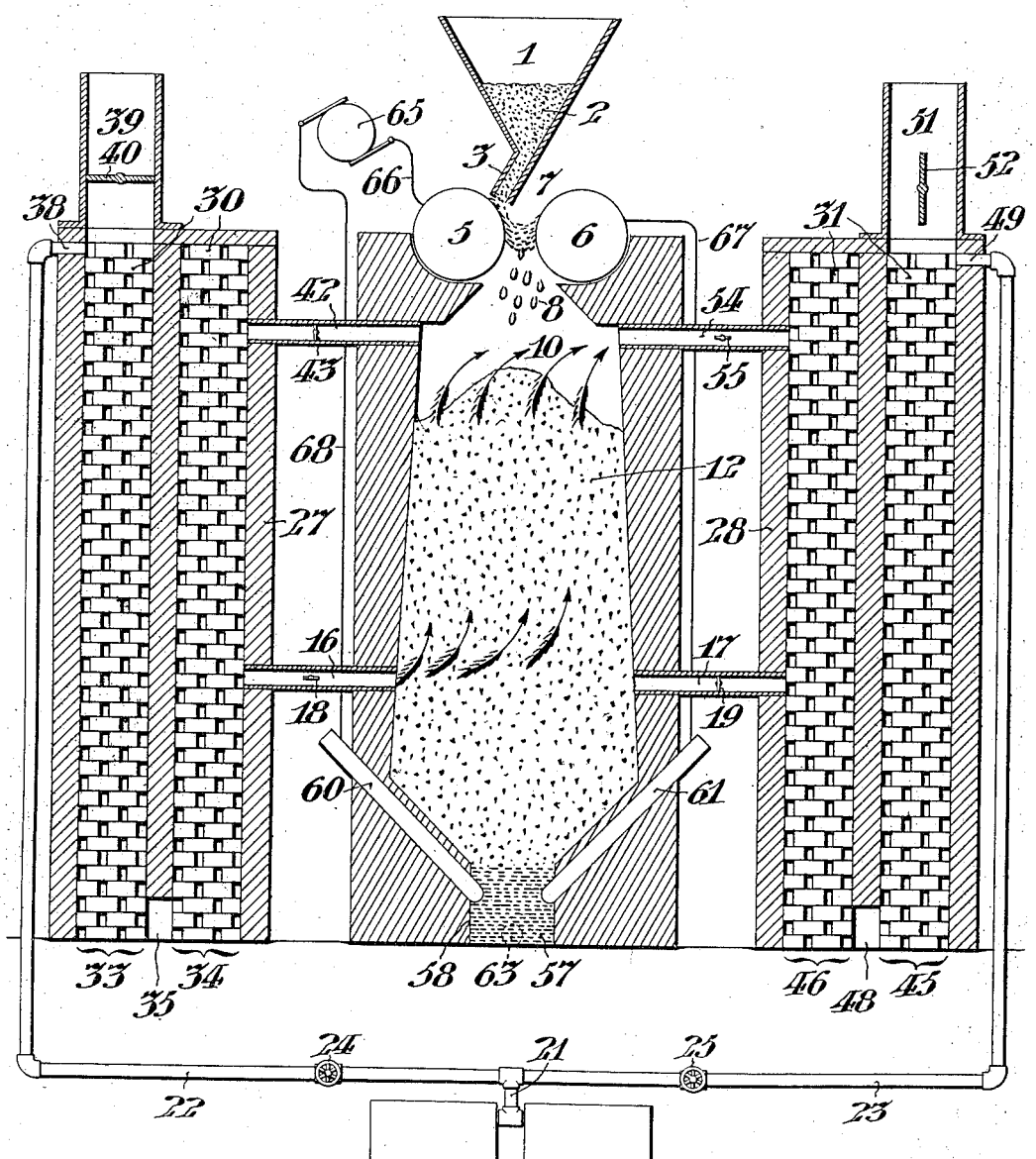
WITNESSES:
Clifton C. Hallowell
John C. Bergner
INVENTOR:
MARCUS RUTHENBURG
by Paige, Paul & Fraley
Att'ys.

UNITED STATES PATENT OFFICE.

MARCUS RUTHENBURG, OF LOCKPORT, NEW YORK.

PROCESS OF MANUFACTURING IRON AND ITS ALLOYS.

No. 818,918.      Specification of Letters Patent.      Patented April 24, 1906.

Application filed November 28, 1903. Serial No 183,052.

*To all whom it may concern:*

Be it known that I, MARCUS RUTHENBURG, of Lockport, in the State of New York, have invented certain new and useful Improvements in Processes of Manufacturing Iron and its Alloys, whereof the following is a specification, reference being had to the accompanying drawings.

The object of my invention is to provide a process which may be conducted continuously, whereby iron and its alloys may be directly manufactured from comminuted ore.

My process consists in fritting the comminuted particles of ore in coherent porous lumps, then while said lumps are at reducing temperature subjecting them to the action of reducing media and reducing them without fusing them and then increasing the temperature of said lumps until the reduced metal is melted.

As hereinafter described, my process contemplates employing an electric circuit for both the fritting and melting operations and employing as the reducing media a carbonaceous or hydrocarbon gas which is preheated.

As an example of the operation of my invention I will describe the treatment of a mass of magnetite in an apparatus such as is shown in the accompanying drawing.

In said drawing, 1 is a hopper which is supplied with the previously-cleaned comminuted magnetite 2, which flows thence through the spout 3 between the opposed electrode-rollers 5 and 6, which are included in an electric circuit hereinafter described. The particles of ore from the spout 3 assemble in a bridge 7 between said rollers 5 and 6 and, forming a path for the electric current, are thereby raised to such temperature as to be fritted in porous lumps 8, which fall within the furnace 10 and form a mass 12, overlying the inlets from the conduits 16 and 17, through which a reducing media may be alternately introduced under control of the valves 18 and 19.

In the apparatus which I have chosen for illustration said reducing media is carbonaceous gas derived from the gas-producer comprising the retorts 20, wherein coal, coke, sawdust, peat, or other suitable material is burned. Said retorts are provided with a common outlet 21 and branch conduits 22 and 23, respectively, controlled by valves 24 and 25 and extending to the counterpart heaters, which comprise stacks 27 and 28, provided with checker-work 30 and 31. Said stack 27 comprises two flues 33 and 34, which are in communication through the passage 35 at the bottom thereof. Immediately adjoining the inlet 38 from the branch pipe 22 the flue 33 is provided with a discharge-outlet 39, controlled by the valve 40. The flue 34 is connected with the chamber 10 by the conduit 16 and by the conduit 42, controlled by the valve 43. Similarly, the stack 28 comprises the flues 45 and 46, which are in communication through the passage 48 at the bottom thereof. Immediately adjoining the inlet 49 from the branch pipe 23 the flue 45 is provided with the discharge-outlet 51, controlled by the valve 52. The flue 46 is connected with the chamber 10 by the conduit 17, aforesaid, and by the pipe 54, controlled by the valve 55. The valve 24 being open and the valve 25 closed and the arrangement of the other valves being as shown, the gas from the producer passes from the pipe 22 down through the checker-work 30 in the flue 33 of the stack 27, through the passage 35 and checker-work 30 in the flue 34 to the conduit 16, and rises thence through the mass of hot fritted ore 12 in the chamber 10, where it burns. The products of combustion escape from the chamber 10 through the conduit 54 into the flue 46 of the stack 28. In its traverse through the flue 46, passage 48, and flue 45 to the outlet 51 the gaseous products of combustion heat the checker-work 31, and it is to be understood that subsequently by reversing the valves controlling the inlets and outlets of said stacks 27 and 28 the producer-gas may be caused to traverse the heated checker-work 31 in the stack 28 before its introduction to the ore 12 and the products of combustion be conducted from said chamber through the stack 27 to heat the checker-work 30 therein. Said stacks being thus employed in alternation, the gas is preheated before its contact with the hot fritted ore 12. The mass of ore 12 in the chamber 10 aforesaid rests upon a bath of molten metal 57, which is maintained in the crucible 58 between the opposed electrodes 60 and 61. It may be noted that the heat retained by the mass of fritted ore 12 after the fritting operation is supplemented by the heat derived from the checker-work by the reducing-gas and by the heat arising from said molten bath 57 to such a degree that the mass of ore is reduced without being fused as it subsides in the chamber 10 to the level of the inlets from the conduits 16 and 17. As the ore passes below said inlets its temperature increases until it comes in contact with the molten bath 57 and is melted therein. The crucible 58 is provided with a vent 63, through which the molten metal may be withdrawn continuously or at any desired intervals.

The fritting operation requires approximately one hundred volts and the melting of the reduced material about fifteen volts. Therefore I find it convenient to connect the rollers 5 and 6 and the electrodes 60 and 61 in series relation with the generator 65 by the conductors 66, 67, and 68, so that the same number of amperes is furnished for each operation; but the voltages divide according to the relative resistances. The low voltage is thus obtained for the melting operation without a special generator, and the unbroken resistance of the fluid-bath 57 steadies the fluctuating resistance of the ore - bridge 7 between the rolls 5 and 6.

Although I prefer to employ apparatus of the type herein described, I do not desire to limit myself thereto, as it is obvious that various modifications may be made in the apparatus employed without departing from the essential features of my process.

I claim—

1. The continuous process of reducing ore to the metallic state, which consists in fritting comminuted particles of ore in coherent porous lumps, collecting the lumps in a confined heated atmosphere, then before said lumps have fallen below a reducing temperature, subjecting them to the action of reducing media in said confined heated atmosphere and reducing them without fusing them, and then increasing the temperature of said lumps, until the reduced metal is melted, substantially as set forth.

2. The continuous process of reducing ore to the metallic state, which consists in fritting comminuted particles of ore in coherent porous lumps, collecting the lumps in a confined heated atmosphere, then before said lumps have fallen below a reducing temperature, subjecting them to the action of reducing media while progressing them through a region heated to reducing temperature and reducing them without fusing them, and then progressing the reduced lumps at reducing temperature into a region at fusing temperature and melting the reduced metal, substantially as set forth.

3. The continuous process of reducing ore to the metallic state, which consists in assembling comminuted particles of ore to form a path for an electric current, so proportioned as to frit said particles into coherent porous lumps, collecting the lumps in a confined heated atmosphere, then before said lumps have fallen below a reducing temperature, subjecting them to the action of reducing media, and reducing them without fusing them, and thaen assembling the reduced lumps to form a path for an electric current, and melting the reduced metal by an electric current passed therethrough, substantially as set forth.

4. The continuous process of reducing ore to the metallic state, which consists in assembling comminuted particles of ore to form a path for an electric current so proportioned as to frit said particles into coherent porous lumps, collecting the lumps in a confined heated atmosphere, then before said lumps have fallen below the reducing temperature, subjecting them to the action of deoxidizing-gas, and reducing them without fusing them, and then assembling the reduced lumps to form a path for an electric current, and thereby melting the reduced metal, substantially as set forth.

5. The process of reducing ore to the metallic state, which consists in fritting comminuted particles of ore in coherent porous lumps, by an electric current, collecting the lumps in a confined heated atmosphere, then before said lumps have fallen below a reducing temperature, subjecting them to the action of deoxidizing-gas until they are reduced without being melted and then melting the reduced lumps by an electric current passed therethrough, substantially as set forth.

In testimony whereof I have hereunto signed my name, at Lockport, this 21st day of November, 1903.

MARCUS RUTHENBURG.

Witnesses:
J. FRANK SMITH,
A. EDMUND LEE.